(12) United States Patent
Bernier et al.

(10) Patent No.: US 8,300,594 B1
(45) Date of Patent: Oct. 30, 2012

(54) METHOD AND APPARATUS SUPPORTING OUT OF BAND SIGNALING FOR WLAN USING NETWORK NAME

(75) Inventors: Eric Bernier, Ottawa (CA); Kent Felske, Kanata (CA); Guyves Achtarl, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 987 days.

(21) Appl. No.: 11/536,913

(22) Filed: Sep. 29, 2006

Related U.S. Application Data (60) Provisional application No. 60/729,320, filed on Oct. 20, 2005.

(51) Int. Cl.
*H04W 4/00* (2009.01)
(52) U.S. Cl. ........................... 370/331; 370/338
(58) Field of Classification Search .......... 370/331, 370/310, 338
See application file for complete search history.

(56) References Cited

U.S. PATENT DOCUMENTS

| | | | |
|---|---|---|---|
| 5,812,531 A * | 9/1998 | Cheung et al. | 370/255 |
| 6,597,906 B1 * | 7/2003 | Van Leeuwen et al. | 455/422.1 |
| 6,597,927 B1 * | 7/2003 | Eswara et al. | 455/562.1 |
| 6,850,740 B1 * | 2/2005 | Haartsen | 455/101 |
| 6,907,229 B2 * | 6/2005 | Shpak | 455/69 |
| 6,993,334 B2 * | 1/2006 | Andrus et al. | 455/437 |
| 7,054,627 B1 * | 5/2006 | Hillman | 455/422.1 |
| 7,127,258 B2 * | 10/2006 | Zegelin | 455/456.1 |
| 7,143,171 B2 * | 11/2006 | Eriksson et al. | 709/227 |
| 7,433,694 B2 * | 10/2008 | Morgan et al. | 455/456.1 |
| 7,636,336 B2 * | 12/2009 | Forte et al. | 370/331 |
| 2002/0059453 A1 * | 5/2002 | Eriksson et al. | 709/238 |
| 2003/0036374 A1 * | 2/2003 | English et al. | 455/403 |
| 2003/0203735 A1 * | 10/2003 | Andrus et al. | 455/450 |
| 2004/0156372 A1 * | 8/2004 | Hussa | 370/401 |
| 2004/0185845 A1 * | 9/2004 | Abhishek et al. | 455/422.1 |
| 2004/0203873 A1 * | 10/2004 | Gray | 455/456.1 |
| 2004/0255297 A1 * | 12/2004 | Horstemeyer | 718/100 |
| 2005/0025182 A1 * | 2/2005 | Nazari | 370/469 |
| 2005/0048972 A1 * | 3/2005 | Dorenbosch et al. | 455/436 |
| 2005/0088993 A1 * | 4/2005 | Jung et al. | 370/331 |
| 2005/0197099 A1 * | 9/2005 | Nehushtan | 455/410 |
| 2005/0272403 A1 * | 12/2005 | Ryu et al. | 455/403 |
| 2006/0046709 A1 * | 3/2006 | Krumm et al. | 455/422.1 |
| 2006/0047742 A1 * | 3/2006 | O'Neill et al. | 709/203 |
| 2006/0211402 A1 * | 9/2006 | Hofmann | 455/355 |
| 2006/0268756 A1 * | 11/2006 | Wang et al. | 370/310 |
| 2007/0026866 A1 * | 2/2007 | Krishnamurthi et al. | 455/440 |
| 2007/0253369 A1 * | 11/2007 | Abhishek et al. | 370/331 |
| 2007/0291698 A1 * | 12/2007 | Lee et al. | 370/331 |

* cited by examiner

*Primary Examiner* — Nathan Mitchell
(74) *Attorney, Agent, or Firm* — Anderson Gorecki & Manaras LLP (57) ABSTRACT

A method and apparatus for communicating wireless network landscape information to a mobile device is shown and described. Strategic placement of beaconing devices that are encoded with pre-defined, specialized SSIDs allows information to be forwarded to the mobile clients to trigger specific behavior in the clients and to enable the clients to pro-actively control network transitions, thereby increasing their ability to provide seamless communications.

20 Claims, 8 Drawing Sheets

METHOD AND APPARATUS SUPPORTING OUT OF BAND SIGNALING FOR WLAN USING NETWORK NAME

CROSS REFERENCE TO RELATED APPLICATIONS

This application claims priority under 35 U.S.C. §1.119 (e) to provisional patent application Ser. No. 60/729,320 filed Oct. 20, 2005 by Bernier, and incorporated herein by reference.

FIELD OF THE INVENTION

This invention relates generally to the field of wireless networking and more particularly to a method and apparatus for transitioning between wireless networks

BACKGROUND OF THE INVENTION

Mobile devices are essentially handheld radios that communicate by exchanging radio signals at defined frequencies with network access points. Mobile devices can gain access to cellular networks via cellular base stations. Mobile devices can gain access to the Internet via wireless Local Area Networks (WLANS) using WiFi access points. WiFi refers to the underlying technology of wireless local area networks (WLAN) based on the IEEE 802.11 specifications. Wi-Fi was originally intended to be used for mobile computing devices, such as laptops, in LANs, but is now often used for increasingly more applications, including Internet access, gaming, and basic connectivity of consumer electronics such as televisions and DVD players. Mobile devices can also gain access to other networks using the WiMAX (802.16) standard wherein a scheduling algorithm is applied to assign a time slot to a subscriber to enable it to communicate with a base station.

The growing rise in handheld devices has increased the demand for wireless network coverage. Because wireless access points have a limited transmission range, providing wireless coverage for an entire building or corporate campus generally requires the integration of multiple wireless local area networks (WLANS) although these provide coverage for a building or campus, cellular networks are still required to provide coverage outside the building or campus. As mobile clients move into or outside the building or campus it is desirable to maintain the continuity of communications even as the clients are transitioned between different wireless networks. One problem with transitioning between networks is that the hand-off of communications is often time consuming, and during the hand-off process the communication may experience interruption, causing frustration for the client. A technique is required to seamlessly transition between wireless networks.

SUMMARY OF THE INVENTION

According to one aspect of the invention, a device includes a transmitter configured to broadcast a signal encoded to provide information regarding one or more wireless networks within range of, but independent from, the device.

According to another aspect of the invention, a method of providing information regarding a wireless network landscape to an application associated with a mobile device includes the steps of identifying coverage areas of wireless networks in the wireless network landscape and providing at one or more locations distributed in the wireless network landscape, a device which transmits information regarding wireless networks that are proximate to the device.

According to a further aspect of the invention, a mobile device includes means for establishing a communication session using one or more wireless networks in a wireless landscape. The mobile device also includes a receiver for receiving signals encoded according to a wireless local area network protocol, where the signals include information associated with portions of the wireless landscape proximate to the mobile device but are provided by a device independent of the wireless landscape. The mobile device includes means, responsive to the information, for initiating a transition of the communication session between a first wireless network in the wireless landscape to a second wireless network.

With such an arrangement, mobile devices may receive advance notification of impending changes in the network landscape, thereby allowing the mobile device to begin the process of transitioning communications from a connected network to a destination network. When the time comes to hand off communication, the network change occurs seamlessly, without disruption. The changes in the network landscape may include an impending network boundary, a change in network security or a so-called 'dead' zone, where no network exists. Signaling of the change in network landscape is performed, in one embodiment, using a richer encoding of the network name. As will be described below, the signaling SSID can be used to trigger an action at the mobile device, and to provide information to the mobile device which can be used to both inform the mobile device about its direction of movement or location, and to allow it to make intelligent connection decisions. These and other advantages of the invention will be described in more detail with regard to the below figures.

DETAILED DESCRIPTION

Figure 1:
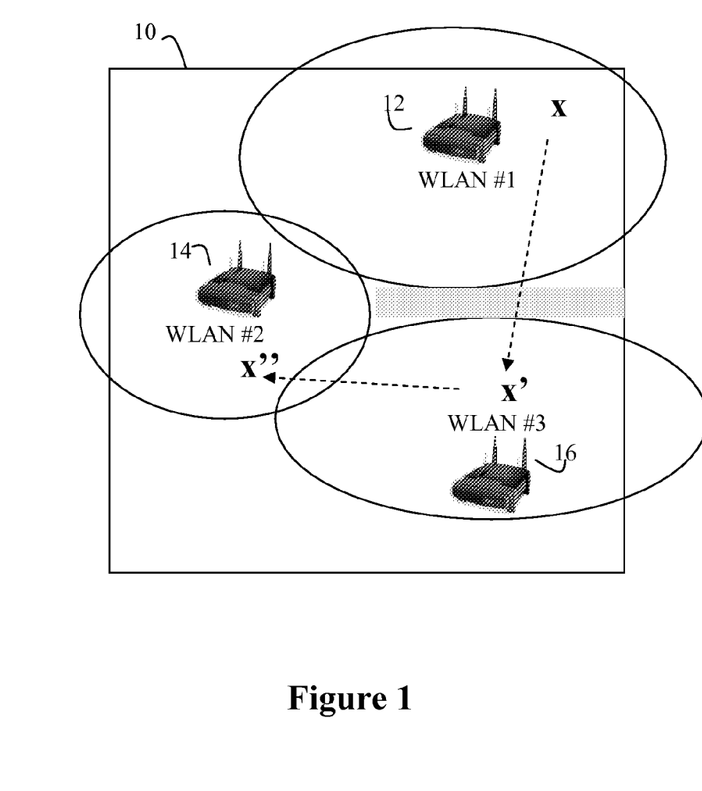
FIG. 1 is a block diagram illustrating a wireless local area network.

FIG. 1 illustrates a wireless network that may be included in a campus 10 of a university, corporation or the like. The wireless network is comprised of three independent wireless Local Area Networks; WLAN #1, WLAN #2, and WLAN #3. Access to the WLANs is obtained for client devices via respective access points 12, 14 and 16. It should be noted that although the invention will be described with reference to the WiFi protocol, and describe access points, the invention may easily be adapted by one of skill in the art to provide identification information to ease the transition between any two networks, including WiFi, WiMAX and others known in the art or later developed.

Each AP broadcasts its SSID (Service Set Identifier, Network name) via packets that are called beacons, which by default are broadcasted every 100 ms according to the IEEE 802.11 protocol. Based on the settings (e.g. the SSID), the client device may select an AP for association. In the example of FIG. 1, the client device in position X associates with WLAN #1 for initial communications.

Access points deployed over the campus may not offer continuous and homogeneous coverage. A weak or non-existent WiFi coverage in some areas of the campus, may lead to a service disruption, or network switchover if available, for a short period of time. A Black hole is defined by a coverage disruption seen by mobile device. Client communications are stalled within a coverage range.

For example, as the client device moves to position X' in FIG. 1 the client crosses a black hole 15 (shown shaded in FIG. 1). In the black hole, the client cannot gain access to any wireless networks, and communications are ceased until the client comes within the range of WLAN #3. As the client device moves to position X", it comes within range of WLAN #2. It may still associate with WLAN #3 until it is out of range, or it may detect the loss of transmission power and transition over to WLAN #2 before communication is completely lost, but either way there is a risk that communications will be undesirably interrupted. As will be described in more detail below, the SSID can be used to provide information to the mobile device to suggest a preferable network to connect to based on a variety of factors.

Figure 2:
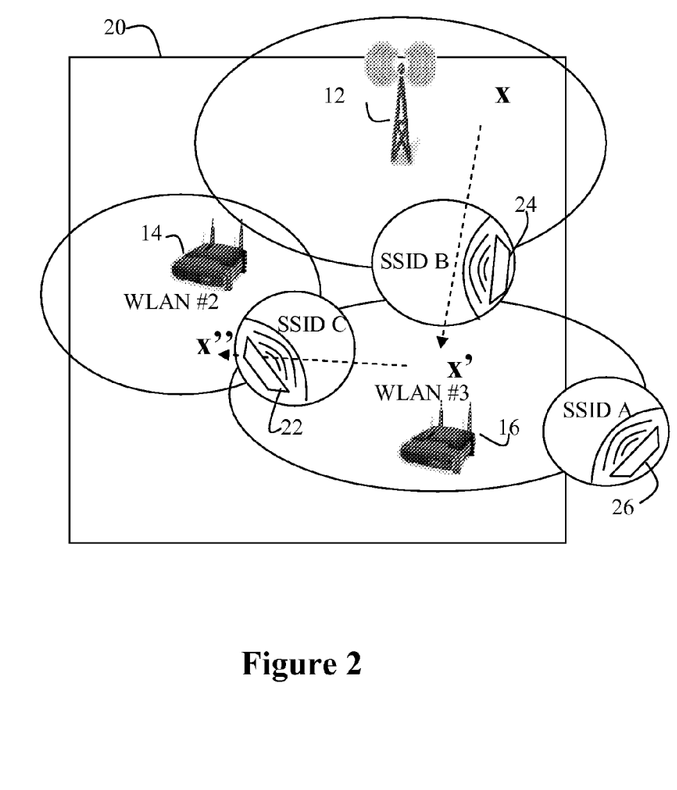
FIG. 2 is a diagram of the wireless LAN of FIG. 1, augmented to include signaling devices of the present invention which enable seamless transition between wireless networks.

Referring now to FIG. 2, the present invention overcomes the problems of FIG. 1 by distributing transmitters of the present invention at various points throughout the wireless network landscape. The transmitter may be any device capable of transmitting a beacon. The transmitter is advantageously dynamically programmable to allow the SSID associated with the beacon to be changed on the fly, although this is not a requirement. The transmitter should include directional and power controls to allow the signaling SSID to be delivered to the appropriate coverage range. In one embodiment an access point device that is capable of simultaneous transmission of multiple SSIDs can be used, although this is not a requirement.

The transmitters of the present invention transmit specialized SSID, referred to hereinafter as signaling SSID, on the beaconing channel at the beaconing intervals. The signaling SSIDs provide advance warning to the client devices of impending changes in the network landscape, such as movement between wireless LANs or the presence of a cellular network tower 12.

Figure 3:
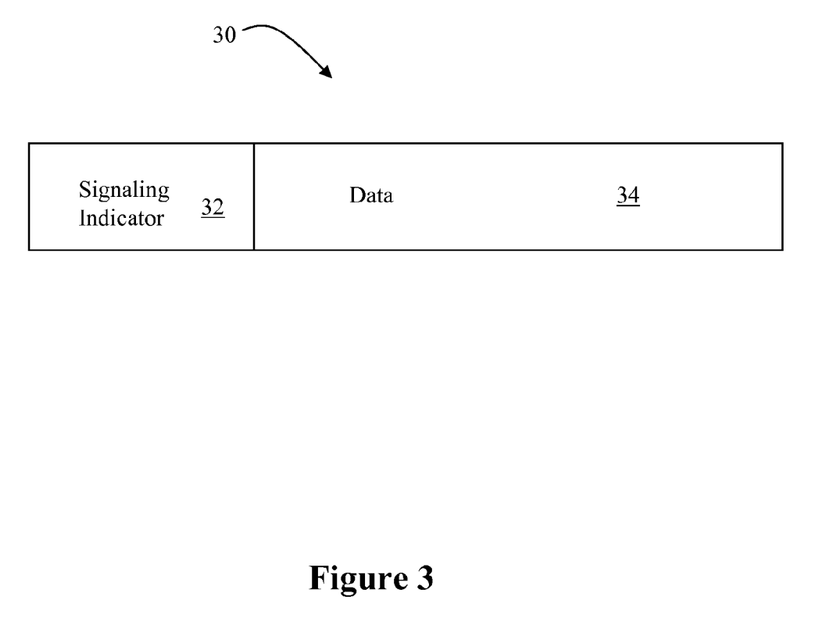
FIG. 3 illustrates one example of how bits in a SSID may be utilized to provide the signaling SSID of the present invention.

FIG. 3 illustrates exemplary fields that may be included in the signaling SSID of the present invention. A typical SSID is a sequence of up to 32 letters or numbers that is the ID, or name, of a wireless local area network. The SSID is set by a network administrator and for open wireless networks the SSID is broadcast to all wireless devices within range of the network access point. The present invention modifies the traditional SSID by allocating at least a portion of the SSID bits to a signaling indicator field 32 with the remainder of the bits being used for signaling data 34.

The signaling indicator is a field arranged to alert a client application that the SSID beacon does not correspond to a network name, but rather the message includes network configuration information that may be of use to the application when making network association decisions. In one embodiment of the invention, the signaling indicator would be human readable and would consist of an alphabetical letter surrounded by the characters < and >, although other mechanisms could be used and the present invention is not limited to the particular use of brackets. Using such alerts, network interface drivers could be advantageously programmed to avoid connection on signaling SSIDs. In addition, signaling SSIDs could be directed to specific memory locations to simplify filtering by the application. In such an embodiment, different alphabetical letters may indicate different conditions to the application.

The SSID may be programmed to identify a variety of different network conditions. For example, the signaling SSID could be used to indicate a zone where transmission power is limited due to proximity of sensitive equipment such as medical equipment or the like. It could be used to signal a network operator preference, or could be used to signal a turn off zone where it is preferred that mobile devices not be used (for example, movie theaters, hospitals, airports, etc.).

Some examples of signaling SSIDs, their associated alert conditions and possible application action are found in below Table I:

TABLE I

| Signaling SSID | Alert | Action |
|---|---|---|
| <B> | Network Boundary Near | Select new network and begin association |
| <S> | Modified Security Setting | Verify Security Level Sufficiency, or Switch Networks |
| <N> | New IP Address Available | Use new IP address, begin association |
| <O> | Black Hole Near | Alert User of Impending Communication Loss |
| <D> | Dynamic Field | Take action specific to pre-assigned function |

Figure 4:
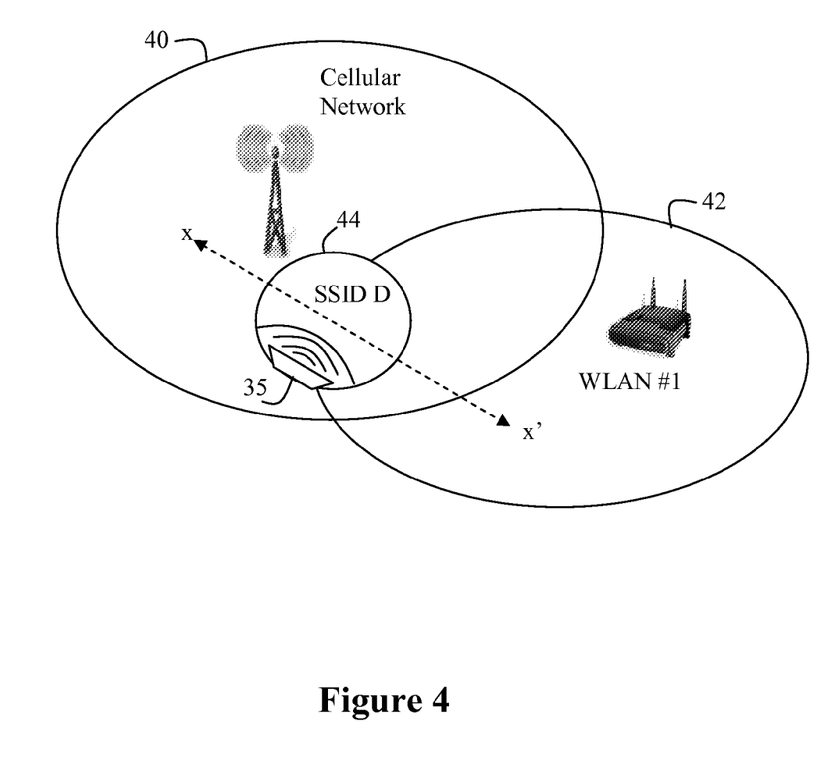
FIG. 4 is a diagram illustrating a wireless network comprised of a cellular network and a wireless LAN, and is provided to illustrate how signaling devices of the present invention may be used to provide seamless transition between cellular networks and wireless LANs.

The boundary signaling SSID <B> could be used to signal the client application of an approaching end to a network boundary. Receiving the alert ahead of time permits the client to make intelligent and timely decisions about network selection, while still achieving seamless network transition. For example, assume that the mobile device is to transition between a cellular network and a WLAN. Receiving an alert that the client is within range of a WLAN boundary may cause the client to transition from the cellular network to a WLAN network, which may provide enhanced performance for the particular Voice over Internet Protocol (VoIP) application being executed by the client. FIG. 4 illustrates the use of a transmitter 35 that is positioned to signal the boundary of a WLAN in a cellular network, thereby enabling the client to make intelligent and timely decisions.

Figure 5:
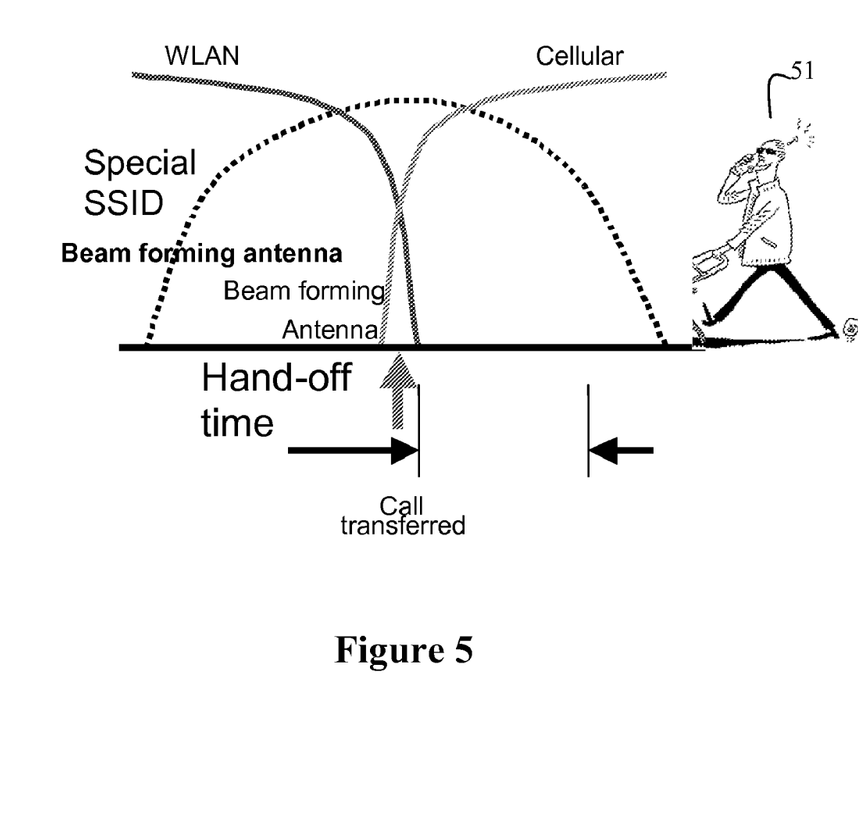
FIG. 5 is provided to illustrate a seamless call transfer between a cellular network and a wireless LAN using the present invention.

FIG. 5 is a timing diagram which pictorially illustrates the benefit in hand-off for such transactions. At time T1, when the mobile user 51 comes within range of the special SSID indicating a WLAN boundary, the application software in the mobile handset can begin the process of associating with the WLAN, and forwarding the databases associated with the communication to the WLAN. When the mobile device comes within WLAN transmission range at time T2, the call may be seamlessly transferred to the WLAN. This transition serves two benefits; first the cost to the user is reduced because calls are transferred to a more cost efficient WLAN. In addition, the cellular bandwidth utilization is reduced, allowing the cellular provider to sell the freed bandwidth to more users for more applications. The present invention therefore provides an enhanced quality of experience to the user with seamless and transparent handoff.

Referring back to FIG. 4, the network boundary signal may also be used to trigger transition from a WLAN to the cellular provider. As a mobile user moves from position X' to position X, the device receives a signaling SSID of <B>, indicating an approaching network boundary. This signal may trigger the handoff of a voice call from VoIP on WLAN #1 to the cellular network 40. Given appropriate signaling, the application can coordinate the handoff and guaranty a minimum disruption of the call. Such capabilities are not currently present in the art, and typically a significant silence period is encountered for such VoIP network transitions.

However, there is other information in addition to a boundary condition that may be of use to an application when selecting one of a variety of available network for association. One example of such information is a security level desired within a particular area. The security signaling SSID <S> is thus used to indicate that a new security setting is being implemented in a wireless network. For example, some corporations may prefer that an application transfer the data over secure networks. As a mobile client enters a secure area, it may encounter a security signaling SSID, requesting that the application be secure and/or transition calls or data to a secure network. Accordingly the signaling SSID may provide an additional methodology for controlling security within a wireless environment.

In addition to signaling the client device that it may need to re-associate, because of boundary or security reasons, the signaling SSID may also provide other information to the client device to enable it to traverse the network landscape in a user friendly manner. For example, the black hole signaling SSID <O> may be used to indicate, to the client device, that it is moving in a direction where there is no coverage. The client device may take any variety of actions in response to such information, including notifying the mobile user of the situation, for example by sending an audible message to the user of the approaching black hole, stating that the connection may be placed on hold while the black hole is traversed. The user can decide to stop walking and finish the conversation or if he continues to walk, the voice application might send an audile message to both the mobile user and his counterpart that the communication is on hold because the user is in the black hole area. For example, the application can send the message: "The user is currently out of reach the call will continue momentarily." Alternatively a video streaming application may temporarily increase the size of a streaming buffer to attempt to bridge the black hole and prevent interruption of the user experience. Thus both pre-emptive and reactive actions may be taken giving the signaling SSID information and presence of network connections.

According to one aspect of the invention, the Signaling SSID may also be used to enable a mobile device to determine a direction of movement and a location within a signaled environment. The direction of movement can be determined by analyzing the signal strength of one or more pair of SSIDs, where the SSIDs could be conventional network SSIDs or the signaling SSIDs of the present invention.

Figure 7A:
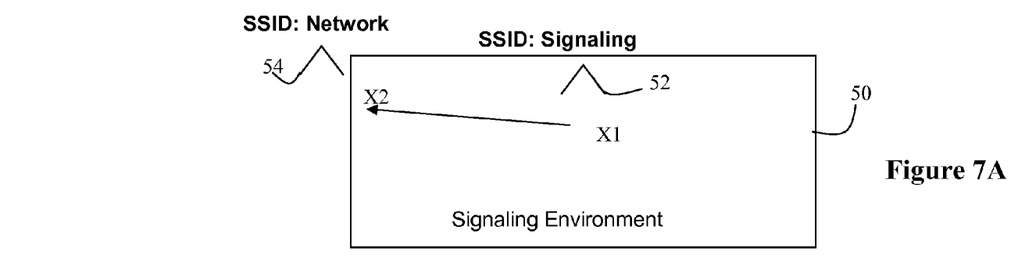
FIGS. 7A and 7B are a block diagram and graph that are used to illustrate how the signaling SSID of the invention can be used to detect a direction of movement of a mobile device.
Figure 7B:
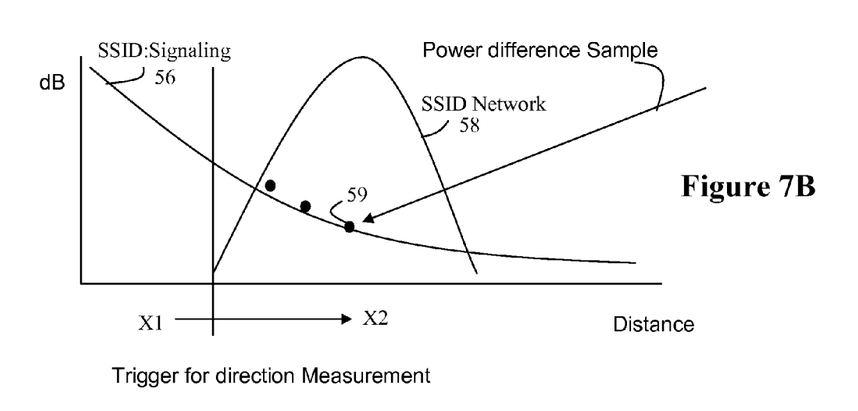

For example, FIG. 7A illustrates a signaling environment 50 where two SSIDs are broadcast; one SSID may be a network SSID 52 broadcast, for example, by a conventional access point and one SSID may be a signaling SSID 54 broadcast by a device of the present invention. FIG. 7B is a graph illustrating SSID signal strength from the two transmitting devices (52 and 54) as perceived by a mobile device in motion, covering a distance between position X1 and position X2. Curve 56 illustrates the received signal strength of SSID signaling transmitter 52 at the mobile device and curve 58 illustrates the received signal strength of the network SSID 54 at the mobile device as the mobile device moves from position X1 to X2. Note that as the mobile device moves away from SSID 52 the received signal diminishes. Thus the change in signal strength can be used to identify a direction of movement of the mobile device.

When the mobile device reaches trigger point Y, it detects an additional SSID (the network SSID 54). Once two SSIDs are detected, the mobile device can periodically calculate a power difference between the two signals. Using the power difference sample and any information known to the mobile device regarding the signaling SSID locations, the mobile device can easily determine the direction of travel as well as the location of the mobile user.

Figure 8A:
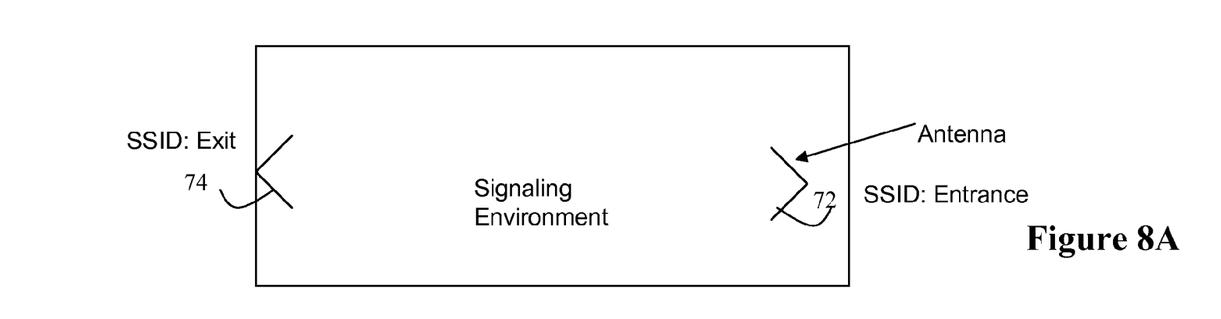
FIGS. 8A and 8B include a block diagram and associated graph that is used to illustrate how the signaling SSID of the present invention may be used to detect a location of a mobile device.
Figure 8B:
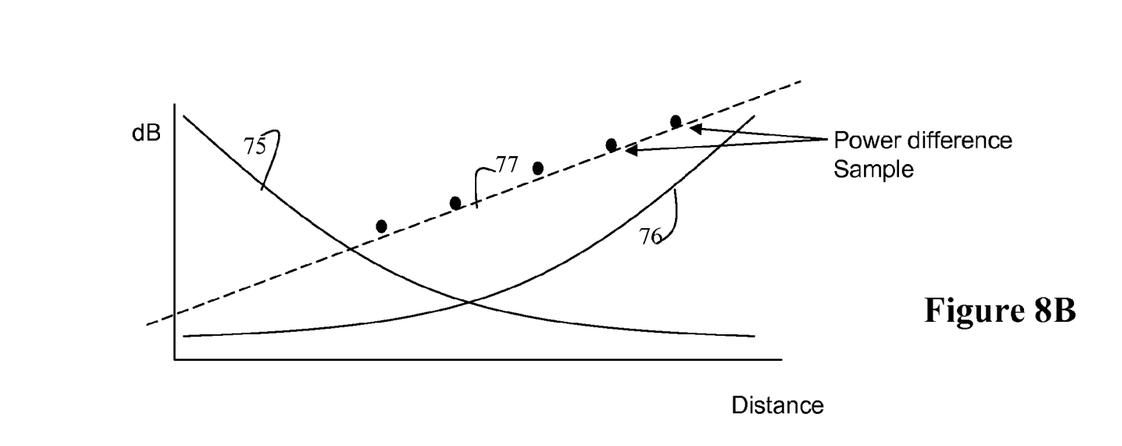

FIGS. 8A and 8B illustrate another example of how the SSIDs may be used to provide location and direction information to a mobile device. In the example of FIGS. 7A and 7B, the signaling SSIDs identify locations in the signaled environments, such as an Entrance 72 and an Exit 74. The signaling SSIDs may include highly directional antennas, and the Signaling SSID may broadcast location information (such as Entrance and Exit) via its SSID signal. A mobile device in the signaled environment can determine its location in the signaling environment by obtaining power difference samples of received SSIDs at the mobile device. The location information may be used for a variety of purposes. For example, the location information may advantageously be used to automatically control the selection of streaming media that is provided to the mobile device. For example, a user in a museum or other signaling environment may use the signaling SSIDs of the present invention to control the stream of media that is provided to the handheld to allow the mobile device to retrieve information that is relevant to the user based on the user's location.

In one embodiment, the signaling SSID may also be used as a data source for the application, although this is not a requirement. (Current protocols such as XML and IP can still be sued to transmit data to the device). For example, a new IP address signaling SSID <N> may include a data field that provides a temporary IP address for a client to use for communications while it obtains its own IP address through association techniques. Thus the signaling SSID can be used to distribute pre-leased IP addresses that will increase the speed with which communications can be transitioned between networks.

The present invention is not limited to the provision of IP addresses in the data field. Rather, it should be understood that the signaling SSID may be dynamically programmed to provide any type of information that may be deemed to be relevant to an application. In addition, it is envisioned that the signaling SSID can be extended to transmit longer and more complex data by allocating a portion of the data field to a document number field, and sequentially populating the data field with different portions of the document, while incrementing the document number field. An end of transmission indicator or other tracking indicator could be used to signal the application that all pages have been transmitted. In such an embodiment, the application would generally define a new signaling SSID alert that would indicate to clients that the transmitter was providing such information. By monitoring the designated signaling SSID at periodic intervals the application could reconstruct the document. The document may include instructions to be performed by the application, or may include IP protocol commands, XML streams, etc.

Accordingly, a variety of signaling SSID have been described that provides information to a client application that may be used by the application in a variety of manners. The above description is not exhaustive, but merely illustrates certain types of signaling SSIDs that one may choose to adopt. Other signaling SSIDs, which may be differently encoded or perform different functions, are considered as equivalents to those explicitly disclosed. Thus the present invention should not be limited to the disclosed examples, but rather may include the use of any out of band signal that is used to provide network landscape information to a mobile unit.

Figure 6:
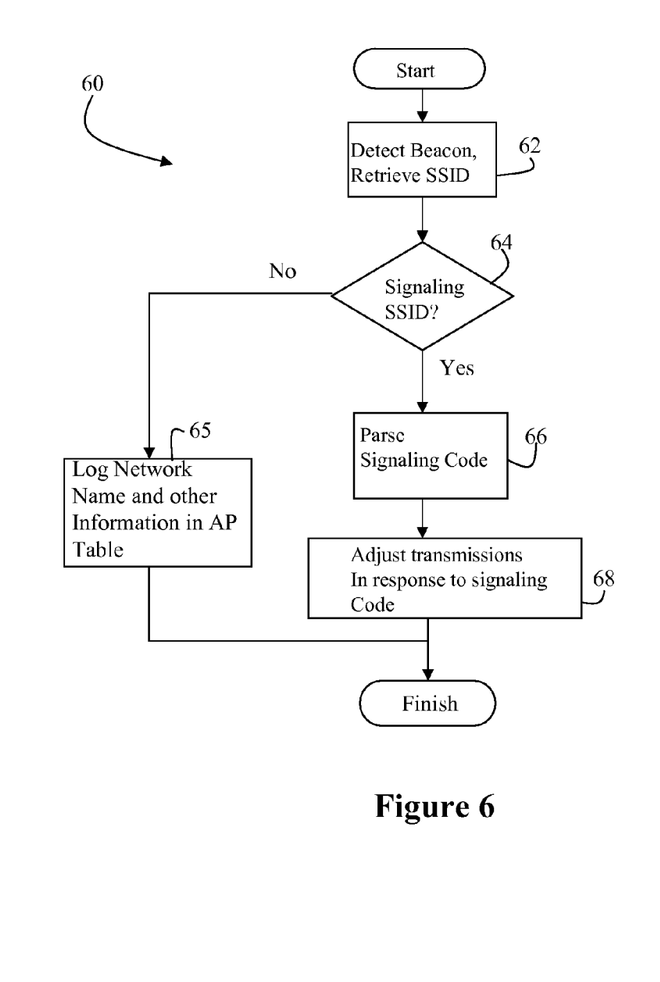
FIG. 6 is a flow diagram illustrating several exemplary steps that may be performed by an application executing on a mobile device upon receipt of the signaling SSID of the present invention.

FIG. 6 is a flow diagram that illustrates exemplary steps that may be performed by a client application upon receipt of a signaling SSID beacon. At step 62, the mobile device receives a beacon and retrieves the SSID. At step 54 the SSID is parsed to determine whether it is a signaling SSID. If the SSID is not a signaling SSID, then at step 55 the SSID is recorded in the network name table of the device, along with the received power of the beacon.

If it is determined at step 54 that the SSID is a signaling SSID, then at step 56 the signaling indicator is parsed to determine the type of signaling SSID, and at step 58 the client device adjusts transmissions in response to the signaling indicator. The adjustment may take many varieties, as described above, depending upon the value of the signaling indicator.

Accordingly a method and apparatus for communicating wireless network landscape information to a mobile device has been shown and described. Strategic placement of beaconing devices that are encoded with pre-defined, specialized SSIDs allows information to be forwarded to the mobile clients to trigger specific behavior in the clients and to enable the clients to pro-actively control network transitions, thereby increasing their ability to provide seamless communications.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A stationary device comprising:
a memory in which is stored a representation of a network condition change associated with a portion of geographical coverage of one or more wireless networks; and
a transmitter configured to broadcast a signal encoded to provide information regarding the one or more wireless networks, the signal being encoded with information indicative of the network condition change associated with the geographical area, but not with information calculated with reference to a map indicating proximity of a mobile device to the portion of geographical coverage in which the condition change exists,
the location of the stationary device and range at which the stationary device broadcasts indicating the portion of geographical coverage in which the condition change exists.

2. The device of claim 1 where the device is a wireless transmitter for transmitting signals in a frequency range of a wireless local area network (LAN) protocol.

3. The device of claim 2 wherein the wireless LAN protocol is an 802.11 protocol and the signal is broadcast in a Service Set Identifier (SSID) channel of the 802.11 protocol.

4. The device of claim 1 wherein the information indicates that a network boundary is within range of the device.

5. The device of claim 1 wherein the information indicates that a change in security setting is within range of the device.

6. The device of claim 1 wherein the information indicates that an inability to provide network access is within range of the device.

7. The device of claim 1 wherein the information is dynamically programmable.

8. The device of claim 1 wherein the information includes an Internet Protocol address for communicating with one of the one or more wireless networks within range of the device.

9. The device of claim 1 wherein the information is compressed.

10. A method of providing information regarding a wireless network landscape to an application associated with a mobile device includes the steps of:
- identifying a coverage area of at least one wireless network in the wireless network landscape;
- identifying a portion of the wireless network landscape in which a condition change exists;
- providing, at the identified portion of the wireless network landscape in which a condition change exists, a stationary device; and
- transmitting, by the stationary device, information including an indication of the network condition change, but not including data calculated with reference to a map indicating proximity of a mobile device to the condition change, such that the location of the stationary device and range at which the stationary device transmits are indicative of the portion of the identified coverage area in which the condition change exists.

11. The method of claim 10, wherein the stationary devices are wireless devices that transmit signals encoded according to a wireless local area network (LAN) protocol.

12. The method of claim 11, wherein the wireless LAN protocol is an 802.11 protocol, and wherein the stationary devices transmit signals using a Service Set Identifier (SSID) channel of the 802.11 protocol.

13. The method of claim 10 wherein the information indicates that a network boundary is within range of the stationary device.

14. The method of claim 10 wherein the information indicates that a change in security setting is within range of the stationary device.

15. The method of claim 10 wherein the information indicates that an inability to provide network access is within range of the stationary device.

16. The method of claim 10 wherein the information is dynamically programmable.

17. The method of claim 10 wherein the information includes an Internet Protocol address for communicating with one of the one or more wireless networks within range of the stationary device.

18. A mobile device comprising:
- means for establishing a communication session using one or more wireless networks in a wireless landscape;
- a receiver for receiving signals encoded according to a wireless local area network protocol, the signals including information associated with portions of the wireless landscape proximate to the mobile device and being provided by a stationary device but not including data calculated with reference to a map identifying proximity of a mobile device to the portions of the wireless landscape; and
- means, responsive to the information, for initiating a transition of the communication session between a first wireless network in the wireless landscape to a second wireless network based on a calculated spatial position of the mobile device.

19. A mobile device comprising:
- means for establishing a communication session using one or more wireless networks in a wireless landscape;
- a receiver for receiving signals encoded according to a wireless local area network protocol, the signals including information associated with portions of the wireless landscape proximate to the mobile device and being provided by a signaling stationary device but not including data calculated with reference to a map identifying proximity of a mobile device to the portions of the wireless landscape;
- means for comparing strengths of signals from the wireless network and from the signaling device to determine a direction of movement of the mobile device; and
- means for reconfiguring the mobile device in preparation for a change in the wireless landscape based on the received information and the direction of movement of the mobile device.

20. A mobile device comprising:
- a receiver for receiving signals encoded according to a wireless local area network protocol, the signals including information associated with portions of a wireless landscape proximate to the mobile device and being provided by a plurality of stationary signaling devices independent of the wireless landscape but not including data calculated with reference to a map identifying proximity of a mobile device to the portions of the wireless landscape;
- means for comparing strengths of different signals provided by the plurality of signaling devices to identify a location of the mobile device; and
- means for reconfiguring the mobile device in preparation for a change in the wireless landscape based on the received information and the location of the mobile device.

* * * * *